(12) United States Patent
Hennessy

(10) Patent No.: US 7,353,083 B2
(45) Date of Patent: Apr. 1, 2008

(54) VANADIUM REDOX BATTERY ENERGY STORAGE AND POWER GENERATION SYSTEM INCORPORATING AND OPTIMIZING DIESEL ENGINE GENERATORS

(75) Inventor: Timothy David John Hennessy, Portland, OR (US)

(73) Assignee: VRB Power Systems Inc., Vancouver, British Columbia (CA)

( * ) Notice: Subject to any disclaimer, the term of this patent is extended or adjusted under 35 U.S.C. 154(b) by 372 days.

(21) Appl. No.: 11/035,466

(22) Filed: Jan. 14, 2005

(65) Prior Publication Data

US 2005/0156431 A1    Jul. 21, 2005

Related U.S. Application Data

(60) Provisional application No. 60/536,573, filed on Jan. 15, 2004.

(51) Int. Cl.
*G06F 19/00* (2006.01)

(52) U.S. Cl. ........................ 700/286; 700/291
(58) Field of Classification Search ................ 700/159, 700/291, 286, 36; 136/251, 291; 209/44, 209/55
See application file for complete search history.

(56) References Cited

U.S. PATENT DOCUMENTS

| | | | |
|---|---|---|---|
| 3,530,003 A | 9/1970 | Warszawski et al. | |
| 3,996,064 A | 12/1976 | Thaller | 320/2 |
| 4,362,791 A | 12/1982 | Kaneko et al. | 429/101 |
| 4,786,567 A | 11/1988 | Skyllas-Kazacos et al. | 429/19 |
| 4,956,244 A | 9/1990 | Shimizu et al. | 429/17 |
| 5,250,158 A | 10/1993 | Kaneko et al. | 204/86 |
| 5,318,865 A | 6/1994 | Kaneko et al. | 429/193 |
| 5,368,762 A | 11/1994 | Sato et al. | 252/62.2 |
| 5,587,132 A | 12/1996 | Nakajima et al. | 423/62 |
| 5,656,390 A | 8/1997 | Kageyama et al. | 429/44 |
| 5,665,212 A | 9/1997 | Zhong et al. | 304/297 R |
| 5,734,255 A * | 3/1998 | Thompson et al. | 290/2 |
| 5,759,711 A | 6/1998 | Miyabayashi et al. | 429/15 |
| 5,851,694 A | 12/1998 | Miyabayashi et al. | 429/105 |

(Continued)

FOREIGN PATENT DOCUMENTS

WO    WO 95/12219    5/1995

(Continued)

OTHER PUBLICATIONS

Bartolozzi, M., "Development of Redox Flow Batteries. A Historical Bibliography," Journal of Power Sources, 27 (1989), pp. 219-234.

(Continued)

*Primary Examiner*—Kidest Bahta
(74) *Attorney, Agent, or Firm*—John R. Thompson; Stoel Rives LLP

(57) ABSTRACT

A power generation system includes a vanadium redox battery that interfaces with a control system to optimize performance and efficiency. The power generation system may include one or more wind turbine generators and one or more diesel fuel generators. The control system manages the vanadium redox battery's absorption and power generation to control system stability and system frequency. The control system further manages the operation of the wind turbine generators and diesel fuel generators to control system stability and voltage.

57 Claims, 6 Drawing Sheets

U.S. PATENT DOCUMENTS

| | | | |
|---|---|---|---|
| 6,143,443 A | 11/2000 | Kazacos et al. | 429/204 |
| 6,461,772 B1 | 10/2002 | Miyake et al. | 429/247 |
| 6,468,688 B2 | 10/2002 | Kazacos et al. | 429/101 |
| 6,562,514 B1 | 5/2003 | Kazacos et al. | 429/204 |
| 6,563,234 B2 | 5/2003 | Hasegawa et al. | 307/66 |
| 6,613,298 B2 | 9/2003 | Tanaka et al. | 423/62 |
| 6,761,945 B1 | 7/2004 | Adachi et al. | 428/36.1 |
| 6,764,789 B1 | 7/2004 | Sekiguchi et al. | 429/105 |
| 2004/0044442 A1* | 3/2004 | Bayoumi et al. | 700/286 |
| 2004/0113431 A1* | 6/2004 | Huang | 290/55 |

FOREIGN PATENT DOCUMENTS

WO      WO 03/092109 A1      11/2003

OTHER PUBLICATIONS

Sum, et al., "A Study of the V(II)/V(III) Redox Couple for Redox Flow Cell Applications," Journal of Power Sources, 15 (1985), pp. 179-190.

Skyllas-Kazacos et al., "Characteristics and performance of 1 kW UNSW vanadium redox battery," Journal of Power Sources, 35 (1991) pp. 399-404.

Skyllas-Kazacos, et al., "Vanadium redox battery prototype: design & development," University of New South Wales, Department of Minerals and Energy, Jan. 1991, 254 pgs.

Kazacos, Michael, "Electrolyte Optimization and Electrode Material Evaluation for the Vanadium Redox Battery," a thesis submitted as part of the requirements for the degree of Master of Science, School of Chemical Engineering and Industrial Chemistry, the University of New South Wales, Feb. 1989, 250 pgs.

Skyllas-Kazacos, et al., "Development of Redox Cell for Remote Area Energy Storage," School of Chemical Engineering & Industrial Chemistry, University of New South Wales, 200 pgs.

International Search Report, PCT/US05/36759, mailed Aug. 29, 2007, 2 pgs.

Written Opinion, PCT/US05/36759, mailed Aug. 29, 2007, 6 pgs.

* cited by examiner

VANADIUM REDOX BATTERY ENERGY STORAGE AND POWER GENERATION SYSTEM INCORPORATING AND OPTIMIZING DIESEL ENGINE GENERATORS

RELATED APPLICATIONS

This application claims priority to U.S. patent application Ser. No. 60/536,573 filed on Jan. 15, 2004, and titled "Power Generation System Incorporating a Vanadium Redox Battery Energy Storage System and Wind Turbine."

TECHNICAL FIELD

This invention relates to power generators and battery storage systems, and more specifically, to wind turbine and diesel fuel generators and vanadium redox battery systems.

BACKGROUND OF THE INVENTION

Domestic and industrial electric power is generally provided by thermal, hydroelectric, and nuclear power plants. New developments in hydroelectric power plants are capable of responding rapidly to power consumption fluctuations, and their outputs are generally controlled to respond to changes in power requirements. However, the number of hydroelectric power plants that can be built is limited to the number of prospective sites. Thermal and nuclear power plants are typically running at maximum or near maximum capacity. Excess power generated by these plants can be stored via pump-up storage power plants, but these require critical topographical conditions, and therefore, the number of prospective sites is determined by the available terrain.

New technological innovations and ever increasing demands in electrical consumption have made wind power plants a viable option. The power output from an individual wind turbine generator or set of wind turbine generators varies as a function of wind speed. Wind speed is stochastic in nature and varies by hour, by day, by season and by year and this reduces the availability or firmness of the resource. The power output cannot be dispatched and its value is therefore discounted.

In order to compensate for wind speed fluctuations, diesel fuel generators may be used in a power supply system. This is particularly useful for remote area power supplies (RAPS) where a link to an extended grid is not available. Diesel fuel generators are a very reliable form of energy but are highly inefficient when operated at less than full capacity. Thus, it is preferable to operate fuel generators at full capacity or not at all rather than operate them at partial capacity.

Vanadium redox batteries have recently received favorable attention, as they promise to be inexpensive and possess many features that provide for long life, flexible design, high reliability, and low operation and maintenance costs. A vanadium redox battery includes cells holding anolyte and catholyte solutions separated by an energy conversion mechanism. The vanadium redox batteries rely on a pumping flow system to pass the anolyte and catholyte solutions through the cells. In operating a vanadium redox battery, flow rates, internal temperatures, pressure, charging and discharging times are all factors that influence power output.

It would be an advancement in the art to provide a stable and constant power output from a wind turbine generator by employing the benefits of a vanadium redox battery. It would be a further advancement in the art to provide such a power supply system which further included optimized use of diesel fuel generators.

BRIEF DESCRIPTION OF THE DRAWINGS

A more particular description of the invention briefly described above will be rendered by reference to the appended drawings. Understanding that these drawings only provide information concerning typical embodiments of the invention and are not therefore to be considered limiting of its scope, the invention will be described and explained with additional specificity and detail through the use of the accompanying drawings, in which.

DETAILED DESCRIPTION OF PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 6, is not intended to limit the scope of the invention, as claimed, but is merely representative of presently preferred embodiments of the invention.

A vanadium redox battery (VRB) is used in conjunction with one or more wind turbine generators and diesel fuel generators to reduce variability in power output from wind turbine generators. A VRB can increase power availability and enhance the value and price that can be charged for wind energy. A VRB provides power output to support machine generators and receives excess power to enable charging. A VRB has a unique 1 to 1 charge-discharge response allowing the VRB to absorb energy from wind gusts and thus smooth out the wind power supply. This allows "spillage" of wind energy in wind turbine generators to be reduced to zero and simplifies the control of the blade pitch angles and yaw control of the wind turbine generator and allows the turbine generator to continuously operate at maximum speed.

Figure 1:
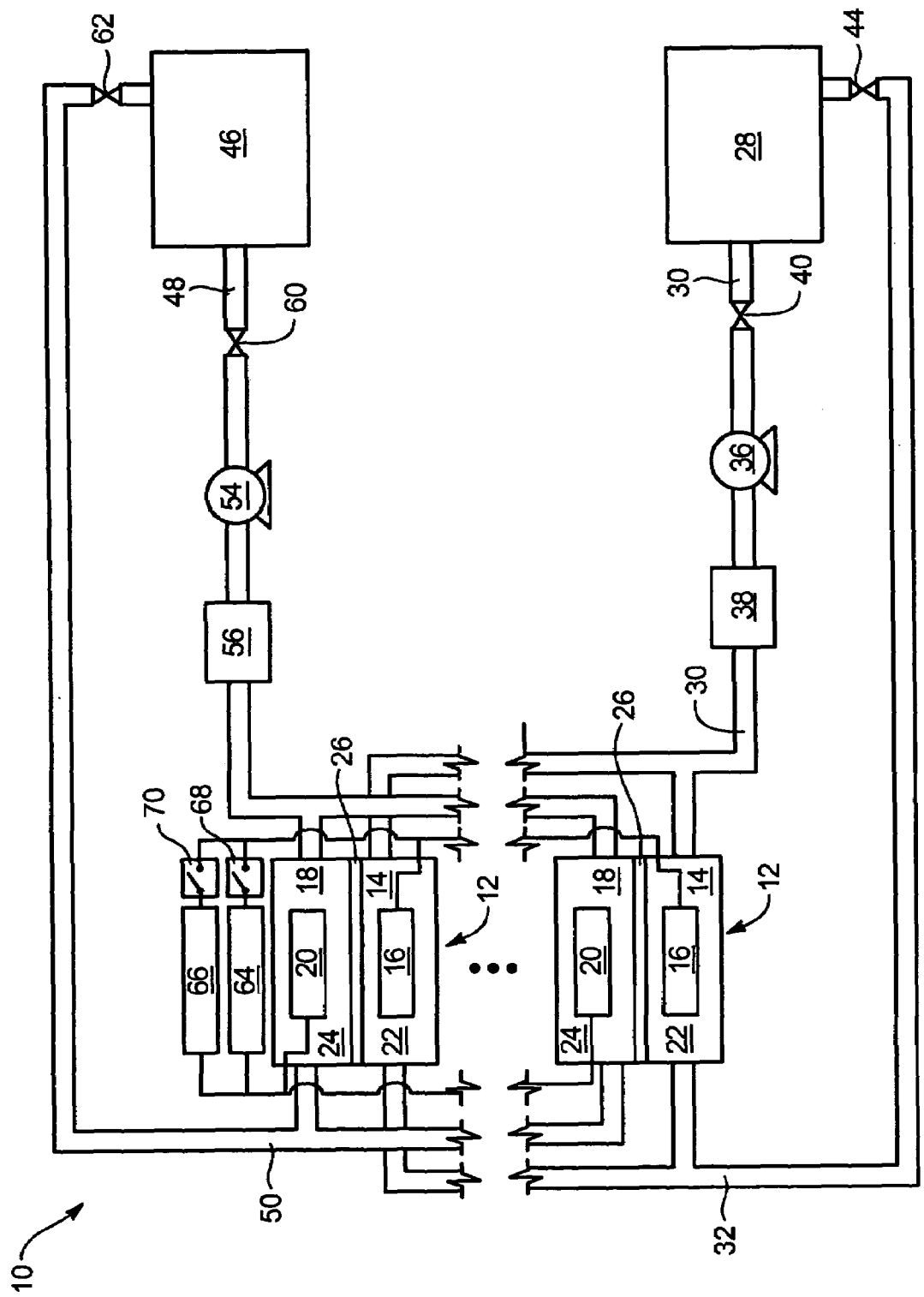
FIG. 1 is a block diagram of an embodiment of a vanadium redox battery energy storage system.

Referring to FIG. 1, a block diagram of a VRB-ESS 10 for use with the present invention is shown. A suitable energy storage system is required for remote power system applications that are supplied by either photovoltaic arrays or wind turbine generators. For such applications, low life-cycle cost and simplicity of operation are major requirements.

The system 10 includes one or more cells 12 that each have a negative compartment 14 with a negative electrode 16 and a positive compartment 18 with a positive electrode 20. Suitable electrodes include any number of components known in the art and may include electrodes manufactured in accordance with the teachings of U.S. Pat. No. 5,665,212, which is hereby incorporated by reference. The negative compartment 14 includes an anolyte solution 22 in electrical communication with the negative electrode 16. The anolyte solution 22 is an electrolyte containing specified redox ions which are in a reduced state and are to be oxidized during the discharge process of a cell 12 or are in an oxidized state and are to be reduced during the charging process of a cell 12 or which are a mixture of these latter reduced ions and ions to be reduced. The positive compartment 18 contains a catholyte solution 24 in electrical communication with the positive electrode 20. The catholyte solution 24 is an electrolyte containing specified redox ions which are in an oxidized state and are to be reduced during the discharge process of a cell 12 or are in a reduced state and are to be oxidized during the charging process of the cell 12 or which are a mixture of these oxidized ions and ions to be oxidized.

The anolyte and catholyte solutions 22, 24 may be prepared in accordance with the teachings of U.S. Pat. Nos. 4,786,567, 6,143,443, 6,468,688, and 6,562,514, which are hereby incorporated by reference, or by other techniques well known in the art. The anolyte solution 22 refers to an electrolyte containing specified redox ions which are in a reduced state and are to be oxidized during the discharge process of a redox battery or are in an oxidized state and are to be reduced during the charging process of a redox battery or which are a mixture of these latter reduced ions and ions to be reduced. The catholyte solution 24 refers to an electrolyte containing specified redox ions which are in an oxidized state and are to be reduced during the discharge process of a redox battery or are in a reduced state and are to be oxidized during the charging process of the redox battery or which are a mixture of these oxidized ions and ions to be oxidized. Further, aqueous NaOH is not included within the scope of anolyte solution 22, and aqueous HCl is not included within the scope of a catholyte solution 24. In one embodiment, the anolyte solution 22 is 1M to 6M $H_2SO_4$ and includes a stabilizing agent in an amount typically in the range of from 0.1 to 20 wt % and the catholyte solution 24 is 1M to 6M $H_2SO_4$.

Each cell 12 includes an ionically conducting separator 26 disposed between the positive and negative compartments 14, 18 and in contact with the catholyte and anolyte solutions 22, 24 to provide ionic communication therebetween. The separator 26 serves as a proton exchange membrane and may include a carbon material which may or may not be purflomatorated.

Additional anolyte solution 22 is held in an anolyte reservoir 28 that is in fluid communication with the negative compartment 14 through an anolyte supply line 30 and an anolyte return line 32. The anolyte reservoir 28 may be embodied as a tank, bladder, or other container known in the art. The anolyte supply line 30 communicates with a pump 36 and a heat exchanger 38. The pump 36 enables fluid movement of the anolyte solution 22 through the anolyte reservoir 28, supply line 30, negative compartment 14, and return line 32. The pump 36 has a variable speed to allow variance in the generated flow rate. The heat exchanger 38 transfers generated heat from the anolyte solution 22 to a fluid or gas medium. The pump 36 and heat exchanger 38 may be selected from any number of known, suitable devices.

The supply line 30 includes one or more supply line valves 40 to control the volumetric flow of anolyte solution. The return line 32 communicates with a return line valves 44 that controls the return volumetric flow.

Similarly, additional catholyte solution 24 is held in a catholyte reservoir 46 that is in fluid communication with the positive compartment 18 through a catholyte supply line 48 and a catholyte return line 50. The catholyte supply line 48 communicates with a pump 54 and a heat exchanger 56. A variable speed pump 54 enables flow of the catholyte solution 22 through the catholyte reservoir 46, supply line 48, positive compartment 18, and return line 50. The supply line 48 includes a supply line valve 60 and the return line 50 includes a return line valve 62.

The negative and positive electrodes 16, 20 are in electrical communication with a power source 64 and a load 66. A power source switch 68 is disposed in series between the power source 64 and each negative electrode 16. Likewise, a load switch 70 is disposed in series between the load 66 and each negative electrode 16. One of skill in the art will appreciate that alternative circuit layouts are possible and the embodiment of FIG. 1 is provided for illustrative purposes only.

In charging, the power source switch 68 is closed and the load switch is opened. Pump 36 pumps the anolyte solution 22 through the negative compartment 14 and anolyte reservoir 28 via anolyte supply and return lines 30, 32. Simultaneously, pump 54 pumps the catholyte solution 24 through the positive compartment 18 and catholyte reservoir 46 via catholyte supply and return lines 48, 50. Each cell 12 is charged by delivering electrical energy from the power source 64 to negative and positive electrodes 16, 20. The electrical energy derives divalent vanadium ions in the anolyte solution 22 and quinvalent vanadium ions in the catholyte solution 24.

Electricity is drawn from each cell 12 by closing load switch 70 and opening power source switch 68. This causes load 66, which is in electrical communication with negative and positive electrodes 16, 20 to withdraw electrical energy. Although not illustrated, a power conversion system may be incorporated to convert DC power to AC power as needed.

A number of control parameters influence the efficiency of the system 10. A key control parameter is the temperature of the anolyte and catholyte solutions 22, 24. The temperature is influenced by ambient conditions and load requirements. Another control parameter is the pressure of the solutions 22, 24 which is influenced by flow rates, state of charge (SOC), temperature, and plant design. A further control parameter is the flow rate which is controlled through variable speed drives. Other control parameters include charging current and duration of constant current periods, as determined by SOC.

Another control parameter is hydrogen evolution. The hydrogen evolution is minimized in the control strategy and is influenced by temperature, SOC, load and rates of charge and discharge which are ramp rates. Another control parameter is the remixing of concentrations of the anolyte and catholyte solutions 22, 24 with respect to volumes. Pressure differentials develop over time as reservoirs 28, 46 have different electrolyte levels due to crossover. Concentrations also vary and system optimization must factor the remixing parameter.

Recharge and discharge periods are additional control parameters. The rate of charge and discharge impact the evolution of hydrogen. In addition, during discharge, heat is developed and the temperature of the anolyte and catholyte solutions 22, 24 is raised. Viscosity is thus affected and pump flow rates need to be adjusted accordingly. The optimal time for charge and discharge is selected within the maximum rates that the system can handle as well as within the loads requirements, i.e. time available in a day.

Figure 2A:
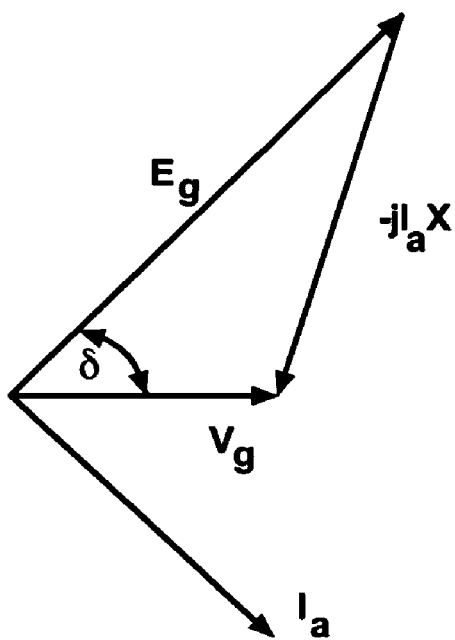
FIG. 2A is a vector diagram illustrating control of a synchronous generator.

Referring to FIG. 2A, a vector diagram illustrating a torque angle that relates to the stability of a synchronous generator is shown. The synchronous generator may be either a wind turbine or a diesel fuel generator. A synchronous generator includes rotating magnetic field structure having a field winding on a rotor and a stationary armature having a stator with an armature winding. By rotating the rotor the field winding and armature winding interact to generate an armature current, $I_a$, in the armature winding. In FIG. 2A, the synchronous generator is overexcited and supplies reactive power and $I_a$ is lagging or capacitive. The synchronous generator is in communication with a VRB, such as that illustrated in FIG. 1, and supplies reactive power to the VRB.

As the name implies, synchronous generators lock a synchronized electrical frequency with the mechanical rate of rotation of the generators and the rotor rotates at the same speed as the magnetic field. An internal generated voltage $E_g$ is generated in the stator due to the magnetic field from the rotor. However, there are voltage losses in the armature caused by armature reaction, self inductance of armature coils, resistance of armature coils, and effect of salient pole rotor shapes. A generated voltage, $V_g$, is given as:

$$V_g = E_g - jXI_a,$$

where X is the synchronous reactance. Voltage at the terminals, $V_t$, is given as $V_t = E_g \cos \delta$, where $\delta$ is the torque angle between $E_g$ and $V_g$. For system stability, $\delta$ must be less than 90 degrees.

Figure 2B:
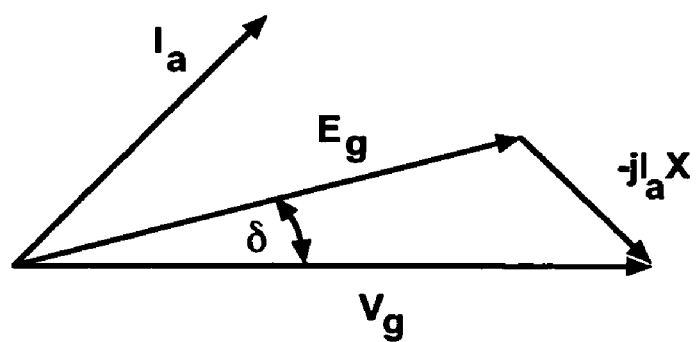
FIG. 2B is an alternative vector diagram illustrating control of a synchronous generator.

Referring to FIG. 2B, a vector diagram illustrates an underexcited synchronous generator with a leading or inductive current, $I_a$. The synchronous generator is drawing reactive energy from a connected VRB. The torque angle is still maintained at less than 90 degrees for system stability.

Figure 3:
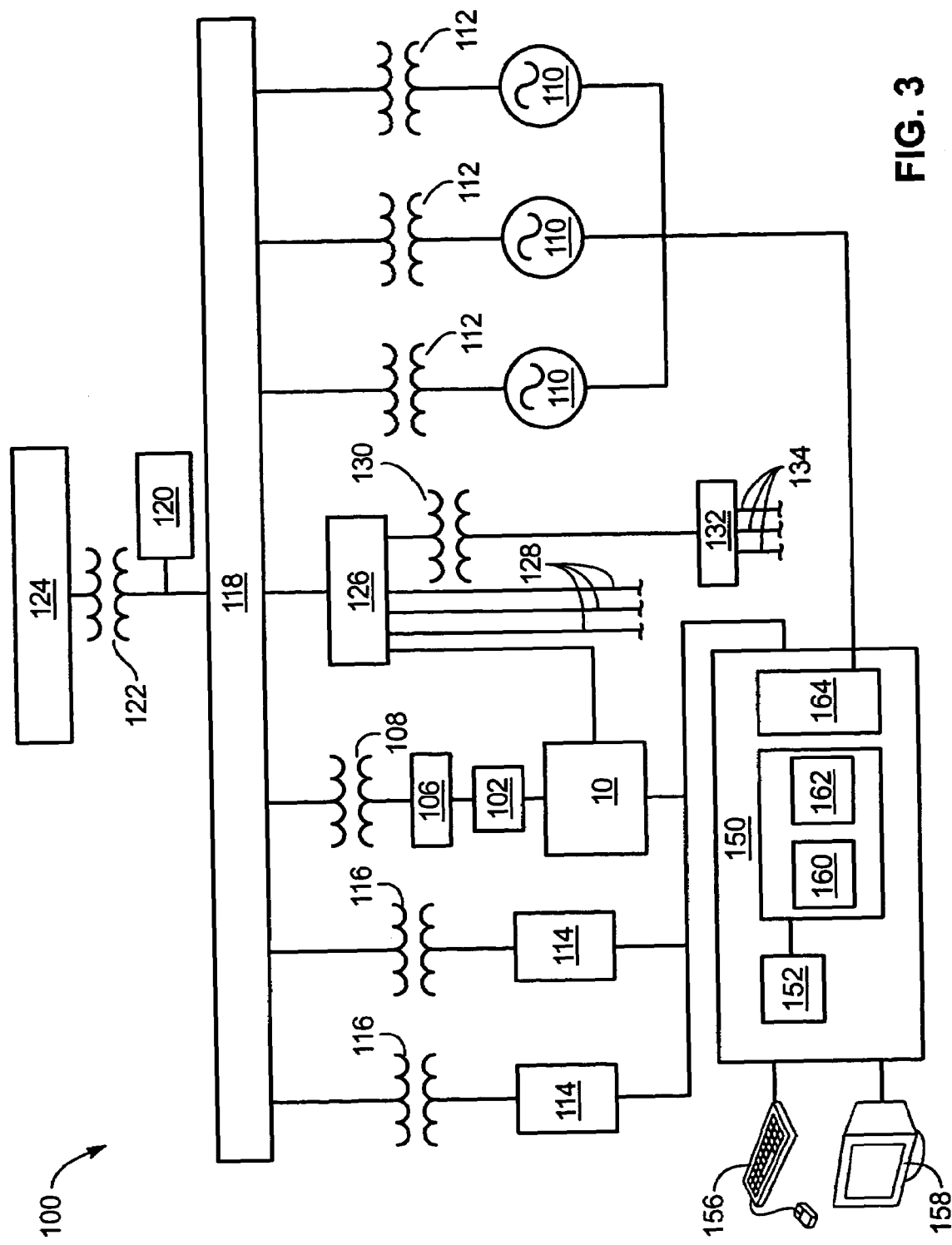
FIG. 3 is a block diagram illustrating an embodiment of a power generation system.

Referring to FIG. 3, a schematic diagram for a power generation system 100 that includes a VRB 10 is shown. The power generation system 100 may be used in an off-grid application where the system 100 is isolated from other generator stations and serves as a RAPS. One of skill in the art will appreciate that the power generation system 100 is for illustrative purposes only and other configurations, implementations, and techniques are within the scope of the invention. The VRB 10 provides a direct current to a coupling circuit 102 and an inverter 104 to convert the direct current to alternating current. The inverter 104 couples to a step up transformer 106 to increase the voltage.

The power generation system 100 includes one or more wind turbine generators 110 that are each in communication with a step up transformer 112. The wind turbine generators 110 may be selected from any number of commercially available devices. A wind turbine generator 110 may have a vertical or horizontal axis and may be an induction type or synchronous machine generator. The power generation system 100 further includes one or more diesel fuel generators 114 that are each in communication with a respective step up transformer 116. The wind turbine generators 110 and diesel fuel generators 114 may be embodied as either induction or synchronous generators.

Each step transformer 108, 112, 116 is in electrical communication with a main switchboard 118 for local power distribution. The main switchboard 112 is in electrical communication with relays 120 for metering and protection, a step up transformer 122 to increase the voltage for remote distribution, and a distribution feeder 124 to enable long range power transmission. A panel board 126 may be coupled to the main switchboard 112 for local power distribution. The panel board 126 is in electrical communication with the VRB 10 to power pumps 36, 54. One or more power lines 128 are in communication with the panel board 126 to provide high voltage supply to one or more applications such as lighting, HVAC, and so forth. A transformer 130, in electrical communication with the panel board 126, steps down the voltage for wall outlets and delivers the voltage to a sub panel 132. The sub panel 132 is in electrical communication with one more wall outlets 134.

The power generation system 100 further includes a control system 150 that interfaces with the VRB 10, wind turbine generators 110, and fuel generators 114 to control their respective operation. The control system 150 manages the performance of the VRB 10 in such a manner as to optimally meet the fundamental parameters of efficiency and safe operation. The control system 150 may further provide self protection in the event of an external or internal fault or failure of a critical component, accurate controlled output as determined by dynamic load requirements or preset performance thresholds, and ambient conditions prevailing from time to time in each cycle.

The control system 150 monitors the power output of the VRB 10, generators 110, 114, and the overall power generation system 100. The control system 150 further monitors the charging and discharging times of the VRB 10. There are several key parameters which control the operation of a VRB 10. For any given concentration of electrolyte solution, the key parameters include temperature, volumetric flow rates, pressure within and across the cells 12, and state of charge of the electrolyte and load as evidenced by the current drawn or supplied. The load may be seen as positive or negative. If negative, then the load is actually supplying power to the VRB 10. All of these parameters continuously change in a dynamic manner and vary with the age of the VRB 10.

The control system 150 may operate the VRB 10 in an automatic mode to ensure that the highest possible efficiency is achieved as measured from the alternating current input to alternating current output on a round trip basis. During operation, the control system 150 may adjust the charging and discharging, pump flow rates, and associated pressures as dynamic changes in VRB components occurs.

The control system 150 may be embodied as a programmable logic computer with a processor 152, micro-controller, or the like for executing applications in accordance with the present invention. The processor 152 is in electrical communication with a memory 154 that receives and stores executable applications and data. The memory 154 may be embodied in various ways and may collectively include different memory devices such as ROM, RAM, EPROM, flash memory, and non-volatile memory, such as a magnetic hard drive, and the like. The control system 150 further includes an input 156 and an output 158 to enable user interaction.

The control system 150 includes a control module 160, resident in memory 154 that monitors and controls the power generation system 100. The control module 160 is an algorithmic application that evaluates the dynamic conditions of the system 100 by monitoring operational data 162 indicative of the system states to enhance performance. The control system 150 includes a communication interface 164 to communicate with the VRB 10, wind turbine generators 110, and fuel generators 114. The communication interface 164 may incorporate any number of conventional protocols known in the art.

The control system 150 manages the interaction of the wind turbine generators 110, fuel generators 114, and VRB 10 to ensure stability and promote efficiency. The control system 150 manages the reactive power output from the fuel generators 114 to support the wind turbine generators 110 and provide a system power output. The fuel generators 114 operate in voltage droop mode and follow the VRB output sharing power on a defined droop curve.

The control system 150 determines when an overexcited condition exists for the wind turbine generators 110 and instructs the VRB 10 to absorb excess power available from the wind turbines 110 and charge the cells 12. Simultaneously, the control system 150 instructs the fuel generators 114 to reduce power output as needed. Similarly, the control system 150 determines when an underexcited condition exists for the wind turbine generators 110 and draws active power from the VRB 10. The control system 150 further instructs the fuel generators 114 to increase power output as needed. In an isolated grid, all control lies with the control system 150 to manage the frequency of the grid.

The power generation system 100 provides a system power output with a constant voltage and constant frequency in an off-grid application. The control system 10 controls the system voltage and frequency by adjusting the VRB 10 power output and the fuel generator 114 power output. The control system 150 continuously monitors power output from the wind turbine generator. When wind turbine power declines, power output from the fuel generators 114 and, if needed, VRB 10 is increased to provide a constant system voltage. When wind turbine power increases, power output from the fuel generators 114 and VRB 10 is decreased. The control system 150 further monitors the frequency of the system power and adjusts the active power generated by the VRB 10 to provide a constant frequency. The power generation system 100 incorporating a VRB 10 is able to respond instantaneously and generate a frequency with a sinusoidal waveform output.

In a similar manner, the power generation system 100 provides a constant voltage in an on-grid application. The control system 150 continuously monitors the power output of the wind turbine generators 114. The power output from the VRB 10 and the fuel generators 114 is increased or decreased accordingly to provide a constant voltage.

Where multiple fuel generators 114 are used, the control system 150 efficiently shares a load between them. The load assigned to the fuel generators 114 varies based on the power output from the wind turbine generators. Each fuel generator 114 operates most efficiently at an optimal load. Fuel generators, and in particular diesel engine generators, are highly inefficient when operated at less than full capacity. Thus, optimization is achieved by operating fuel generators at full capacity.

As can be appreciated, where a system 100 includes four fuel generators, it is preferable to operate two fuel generators at full capacity and have two shut down, rather than operate all four at less than full capacity. The control system 150 operates, to the extent possible, to meet the optimal load for each fuel generator 114. In so doing, a system generates less pollution and air quality is improved. Optimal loads may also differ for each fuel generator 114 based on model, age, or other factors. The control system 150 factors different optimal loads and assigns a load percentage accordingly.

When the fuel generators 114 are engaged to meet a load, percentages of the load are allocated to each fuel generator based on their respective optimal load. The control system 150 may signal one or more fuel generators 114 to power down so that the remaining fuel generators 114 can operate at their optimal load. In some circumstances achieving an optimal load for each fuel generator 114 will not be possible. Nevertheless, the control system 150 improves fuel efficiency and reduces emissions for the fuel generators 114 by load balancing.

In the power generation system 100, the VRB 10 acts as a shock absorber by supplying a stabilizing factor where dynamic load changes occur or where wind turbine generation supply varies. Load changes can result in an increase or decrease in torque angle δ. This can lead to oscillations in speed and to frequency and to system instability. The exact mechanical versus electrical relationships to ensure a balance, is determined by a "swing equation" for each system of generators. The control system 150 prevents this from occurring by instructing the VRB 10 to supply energy or absorbing excess energy as required and effectively control the torque angle δ. By including a VRB 10, the system can be operated closer to its stability limits and more efficiently.

Figure 4:
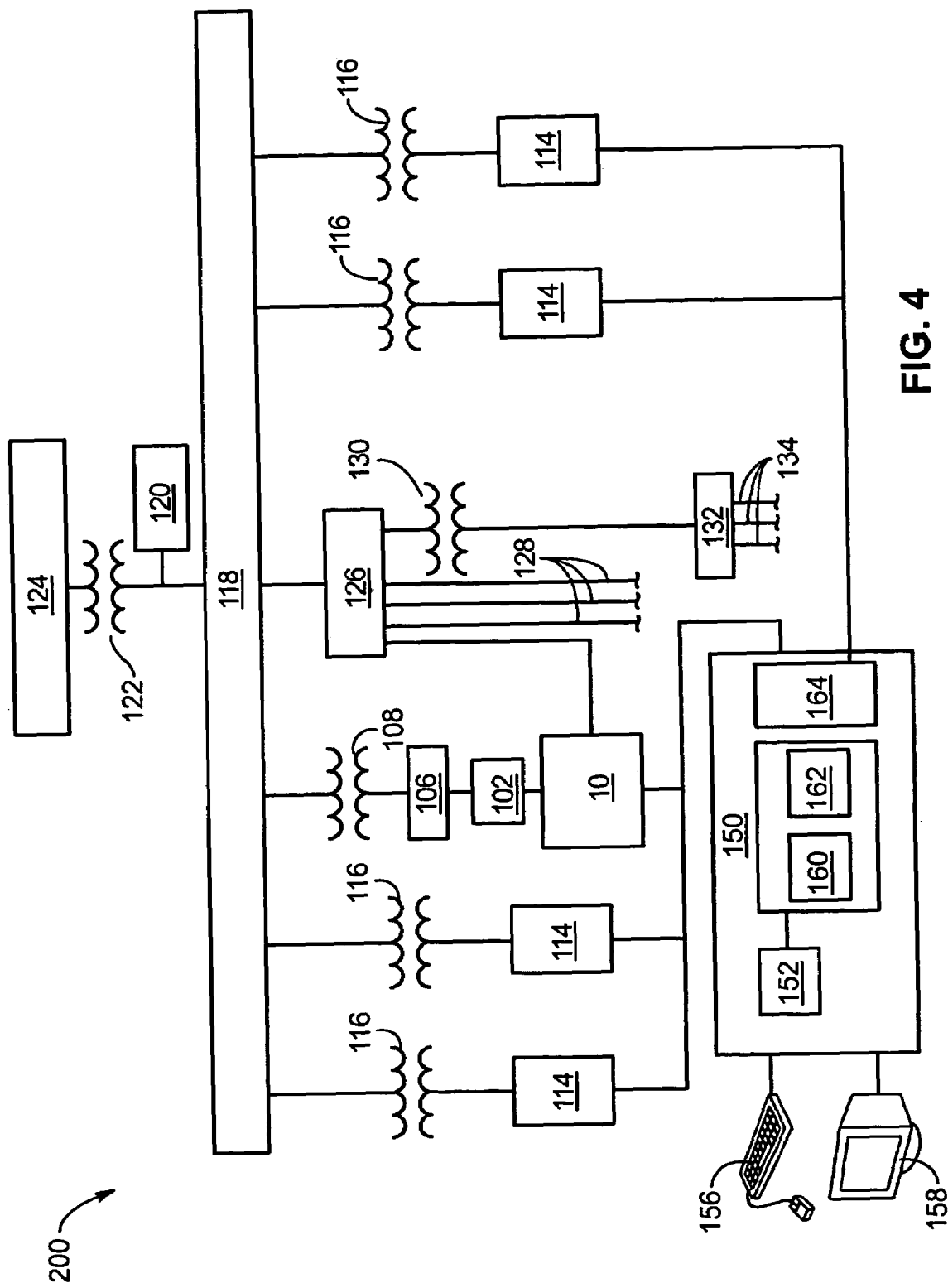
FIG. 4 is a block diagram illustrating an alternative embodiment of a power generation system.

Referring to FIG. 4, a block diagram of an alternative power generation system 200 is shown. The power generation system 200 differs from that illustrated in FIG. 3 in that it does not include one or more wind turbine generators 110. The system 200 includes a VRB 10 to improve system stability and provide a constant voltage. The system 200 also includes a control system 150 to operate the VRB 10 and implement load sharing between the fuel generators 114. The control system 150 operates the fuel generators 114 with the VRB 10 to optimize the system efficiency and reduce pollution of the fuel generators 114. As with the system 100, the power generation system 200 may be operated in an off-grid application.

The control system 150 improves system efficiency and reduces emissions by sharing an overall load to achieve an optimal load for each fuel generator 114. As the overall load for the power generation system 200 increases, the control system 150 draws active power from the VRB 10 to compensate and the fuel generators 114 continue to operate at their respective optimal loads. The control system 150 may also power up any fuel generator that is inactive.

As the overall load decreases, the control system 150 instructs the VRB 10 to absorb excess power from the fuel generators 114. The VRB 10 charges while the fuel generators 114 continue to operate at their optimal load. When the VRB 10 is fully charged and when operating at a reduced load, the control system 150 may power down one or more of the fuel generators 114. The VRB 10 is then able to provide power for subsequent use.

As in the power generation system 100, the VRB 10 acts as a shock absorber during substantial load changes. The control system 150 maintains the torque angle δ by having the VRB 10 absorb excess power from the fuel generators 114 or supply power as required.

Figure 5:
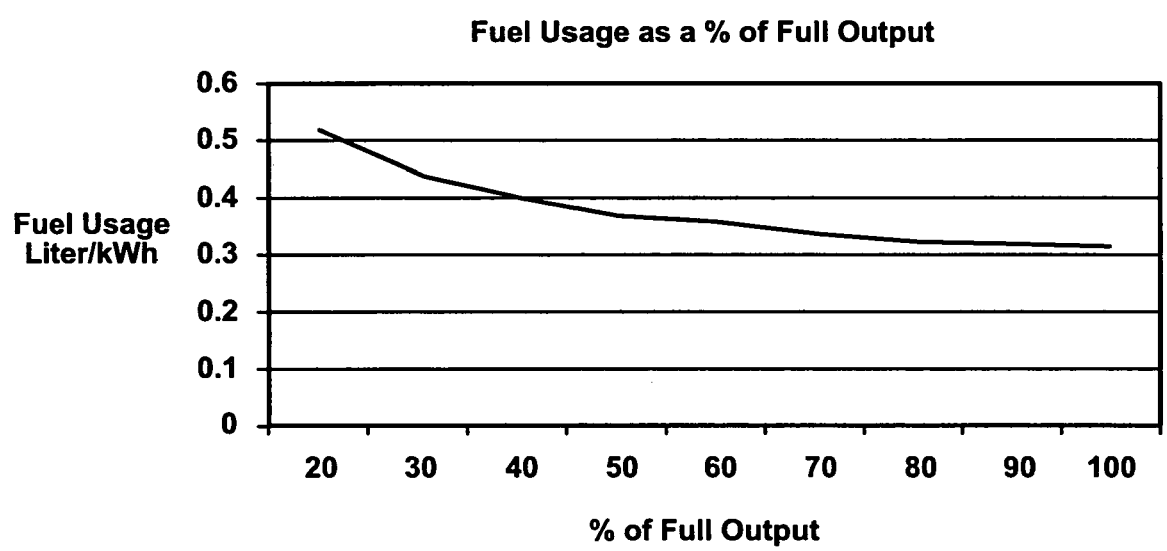
FIG. 5 is a graph illustrating fuel usage as a percentage of power output for a diesel fuel generator.

Referring to FIG. 5, a graph illustrates the efficiency curve of fuel usage for a fuel generator 114 provided by the power generation system 200 of FIG. 4. FIG. 5 illustrates the improvements due to increased loading provided by the control system 150.

Figure 6:
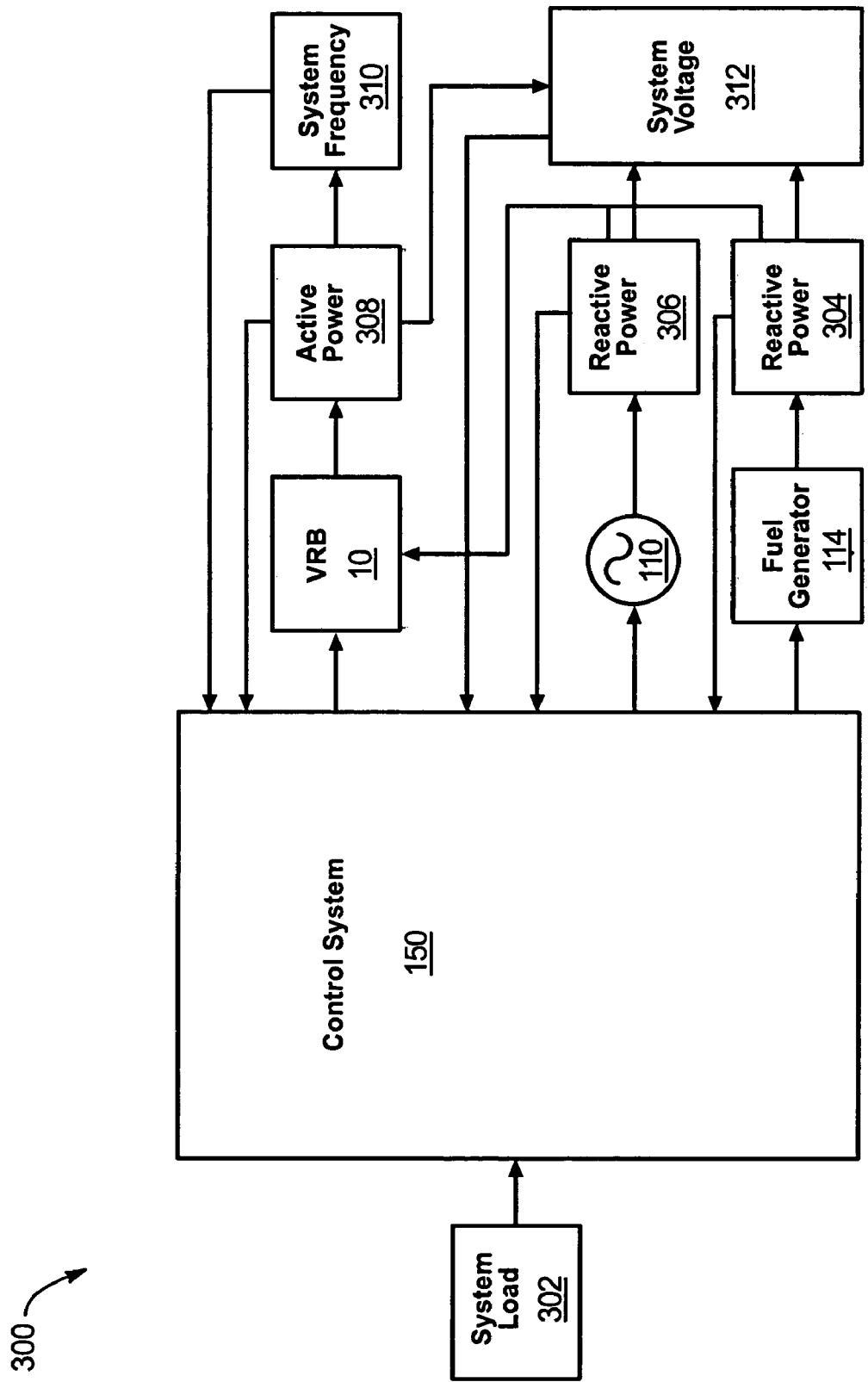
FIG. 6 is a block diagram illustrating a methodology for controlling frequency and voltage in a power generation system.

Referring to FIG. 6, a block diagram is shown of a control methodology 300 for a control system 150. The methodology 300 is for use with the power generation system 100 previously described. The control system 150 receives data indicative of a system load 302 to monitor system load changes. In response to load changes, the control system 150 instructs the VRB 10 to absorb reactive power 304, 306 or generate active power 308.

The control system 150 further monitors the reactive power output of the wind turbine generators 110 and the fuel generators 114. The control system 150 responds to wind power fluctuations by operating the VRB 10 and fuel generators 114 to ensure system stability. The control system 150 further operates to balance a load between two or more fuel generators 114.

In an off-grid application, the control system 150 operates to provide a constant system frequency 310. The system frequency 310 is monitored by the control system 150. When the system frequency 310 changes due to any number of factors, the control system 150 operates the VRB 10 to adjust the active power output to maintain a constant system frequency 310.

Although effective for off-grid applications, the system frequency control is not possible in on-grid applications. Thus, in on-grid applications the control system 150 does not adjust the active power 308 to provide a constant system frequency 310. Nevertheless, active power 308 is monitored and adjusted to ensure system stability as discussed previously above.

In either on-grid or off-grid applications, the control system 150 operates the wind turbine generators 110 and fuel generators 114 to generate reactive power 304, 306 to maintain a constant system voltage 312. The control system 150 instructs the fuel generators 114 to adjust reactive power output to compensate for wind power fluctuations and ensure a constant voltage. Active power 308 is also managed by the control system 150 when necessary to maintain a constant voltage. In off-grid applications, the control system 150 operates as a frequency and voltage controller. The control system 150 is able to provide a nearly instantaneous response to provide a quality output in both the frequency and voltage.

The methodology for the power generation system 200 is similar to that shown in FIG. 6, but does not include a wind turbine generator 110 and the associated reactive power 306. Instead, the power generation system 200 relies entirely on reactive power 304 generated by fuel generators 114. The control system 150 ensures a constant system voltage 312 by monitoring the system voltage 312 and adjusting the reactive power 304 accordingly. The control system 150 of the power generation system 200 further controls the active power to maintain system frequency 310 in off-grid applications. Thus, the power generation system 200 provides both voltage and frequency control in off-grid applications and voltage control in on-grid applications.

Power generation systems disclosed herein provide a control system that efficiently manages one or more power generators and a VRB to provide a high quality power output. A control system maintains system stability by monitoring power outputs and dynamically adjusting active and reactive power accordingly. In off-grid applications, the control system operates as a frequency and voltage controller. In on-grid applications, the control system operates as a voltage controller. The control system further monitors and balances loads between fuel generators to improve operating conditions and reduce emissions. A power generation system of the present invention improves the reliability, quality, and value of wind power.

It will be obvious to those having skill in the art that many changes may be made to the details of the above-described embodiments without departing from the underlying principles of the invention. The scope of the present invention should, therefore, be determined only by the following claims.

The invention claimed is:

1. A power generation system to generate and store power, comprising:
   a vanadium redox battery to absorb power and generate battery power;
   a wind turbine generator to generate wind power responsive to wind currents;
   a fuel generator to generate fuel power responsive to consumed fuel; and
   a control system in electrical communication with the vanadium redox battery to control power absorption and generation, in electrical communication with the wind turbine generator, and in electrical communication with the fuel generator to control fuel power generation, the control system including,
   a processor, and
   a memory in electrical communication with the processor and having a control program, the control program performing the method of,
   monitoring a system load,
   monitoring generated wind power,
   determining a system stability, and
   based on the monitored system load and generated wind power, improving fuel usage and maintaining the system stability by
   instructing the vanadium redox battery to selectively absorb at least a portion of the fuel power from the fuel generator,
   instructing the vanadium redox battery to selectively absorb at least a portion of the wind power from the wind turbine generator,
   instructing the vanadium redox battery to selectively generate the battery power, and
   instructing the fuel generator to selectively generate the fuel power.

2. The power generation system of claim 1, wherein the method performed by the control program further includes instructing the vanadium redox battery to generate battery power to maintain a substantially constant system frequency.

3. The power generation system of claim 1, wherein determining a state of the system stability includes calculating a torque angle, and wherein instructing the vanadium redox battery and the fuel generator to generate battery power and fuel power to maintain the system stability includes instructing the vanadium redox battery and fuel generator to generate battery power and fuel power to maintain a torque angle at less than 90 degrees.

4. The power generation system of claim 1, wherein the method performed by the control program further includes instructing the vanadium redox battery to absorb fuel power and wind power to maintain a substantially constant system voltage.

5. The power generation system of claim 1, further comprising a second fuel generator, and wherein the method performed by the control program further includes balancing a percentage of the system load between the fuel generators to achieve an optimal load for each fuel generator.

6. The power generation system of claim 5, wherein the method performed by the control program further includes powering down the second fuel generator to achieve an optimal load for the first fuel generator.

7. The power generation system of claim 5, wherein the method performed by the control program further includes powering up the second fuel generator to achieve an optimal load for the first fuel generator.

8. A control system for electrically communicating with a vanadium redox battery to control power absorption and generation, for electrically communicating with a wind turbine generator, and for electrically communicating with a fuel generator to control fuel power generation, the control system comprising:
a processor; and
a memory in electrical communication with the processor and having a control program, the control program performing the method of,
monitoring a system load
monitoring generated wind power,
determining a system stability, and
based on the monitored system load and generated wind power, improving fuel usage and maintaining the system stability by
instructing the vanadium redox battery to selectively absorb at least a portion of the fuel power from the fuel generator,
instructing the vanadium redox battery to selectively absorb at least a portion of the wind power from the wind turbine generator,
instructing the vanadium redox battery to selectively generate the battery power, and
instructing the fuel generator to selectively generate the fuel power.

9. The control system of claim 8, wherein the method performed by the control program further includes instructing the vanadium redox battery to generate battery power to maintain a substantially constant system frequency.

10. The control system of claim 8, wherein determining the system stability includes calculating a torque angle, and wherein instructing the vanadium redox battery and the fuel generator to generate battery power and fuel power to maintain the system stability includes instructing the vanadium redox battery and the fuel generator to generate battery power and fuel power to maintain a torque angle at less than 90 degrees.

11. The control system of claim 8, wherein the method performed by the control program further includes instructing the vanadium redox battery to absorb fuel power and wind power to maintain a substantially constant system voltage.

12. The control system of claim 8, wherein the method performed by the control program further includes balancing a percentage of the system load between the first fuel generator and a second fuel generator to achieve an optimal load for each fuel generator.

13. The control system of claim 12, wherein the method performed by the control program further includes powering down the second fuel generator to achieve an optimal load for the first fuel generator.

14. The control system of claim 12, wherein the method performed by the control program further includes powering up the second fuel generator to achieve an optimal load for the first fuel generator.

15. A method for operating a power generation system including a vanadium redox battery, a wind turbine, and a fuel generator, comprising:
monitoring a system load;
monitoring generated wind power;
determining a system stability; and
based on the monitored system load and generated wind power, improving fuel usage and maintaining the system stability by
instructing the vanadium redox battery to selectively absorb at least a portion of the fuel power from the fuel generator,
instructing the vanadium redox battery to selectively absorb at least a portion of the wind power from the wind turbine generator,
instructing the vanadium redox battery to selectively generate the battery power, and
instructing the fuel generator to selectively generate the fuel power.

16. The method of claim 15 further comprising operating the vanadium redox battery to generate battery power to maintain a substantially constant system frequency.

17. The method of claim 15, wherein determining the system stability includes calculating a torque angle, and wherein operating the vanadium redox battery and the fuel generator to generate battery power and fuel power to maintain the system stability includes operating the vanadium redox battery and the fuel generator to generate battery power and fuel power to maintain a torque angle at less than 90 degrees.

18. The method of claim 15, further comprising instructing the vanadium redox battery to absorb fuel power and wind power to maintain a substantially constant system voltage.

19. The method of claim 15, further comprising balancing a percentage of the system load between the first fuel generator and a second fuel generator to achieve an optimal load for each fuel generator.

20. The method of claim 19, further comprising powering down the second fuel generator to achieve an optimal load for the first fuel generator.

21. The method of claim 19, further comprising powering up the second fuel generator to achieve an optimal load for the first fuel generator.

22. A computer readable medium having stored thereon computer executable instructions for performing a method for operating a power generation system including a vanadium redox battery, a wind turbine, and a fuel generator, the method comprising:
monitoring a system load;
monitoring generated wind power;
determining a system stability; and
based on the monitored system load and generated wind power, improving fuel usage and maintaining the system stability by
instructing the vanadium redox battery to selectively absorb at least a portion of the fuel power from the fuel generator,
instructing the vanadium redox battery to selectively absorb at least a portion of the wind power from the wind turbine generator,
instructing the vanadium redox battery to selectively generate the battery power, and
instructing the fuel generator to selectively generate the fuel power.

23. The computer readable medium of claim 22, wherein the method further comprises operating the vanadium redox battery to generate battery power to maintain a substantially constant system frequency.

24. The computer readable medium of claim 22, wherein determining the system stability includes calculating a torque angle, and wherein operating the vanadium redox battery and the fuel generator to generate battery power and fuel power to maintain the system stability includes operating the vanadium redox battery and the fuel generator to generate battery power and fuel power to maintain a torque angle at less than 90 degrees.

25. The computer readable medium of claim 22, wherein the method further comprises instructing the vanadium redox battery to absorb fuel power and wind power to maintain a substantially constant system voltage.

26. The computer readable medium of claim 22, wherein the method further comprises balancing a percentage of the system load between the first fuel generator and a second fuel generator to achieve an optimal load for each fuel generator.

27. The computer readable medium of claim 26, wherein the method further comprises powering down the second fuel generator to achieve an optimal load for the first fuel generator.

28. The computer readable medium of claim 26, wherein the method further comprises powering up the second fuel generator to achieve an optimal load for the first fuel generator.

29. A power generation system to generate and store power, comprising:
  a vanadium redox battery to absorb power and generate battery power;
  a plurality of fuel generators to generate fuel power responsive to consumed fuel; and
  a control system in electrical communication with the vanadium redox battery to control power absorption and generation, and in electrical communication with the fuel generators to control fuel power generation, the control system including,
    a processor, and
    a memory in electrical communication with the processor and having a control program, the control program performing the method of,
      monitoring a system load,
      determining a system stability,
      instructing the vanadium redox battery and the fuel generators to generate battery power and fuel power to maintain a system stability, and
      instructing the vanadium redox battery and the fuel generators to generate battery power and fuel power to maintain a substantially constant system voltage.

30. The power generation system of claim 29, wherein the method performed by the control program further includes instructing the vanadium redox battery to generate battery power to maintain a substantially constant system frequency.

31. The power generation system of claim 29, wherein determining a state of the system stability includes calculating a torque angle, and wherein instructing the vanadium redox battery and the fuel generators to generate battery power and fuel power to maintain the system stability includes instructing the vanadium redox battery and the fuel generators to generate battery power and fuel power to maintain a torque angle at less than 90 degrees.

32. The power generation system of claim 29, wherein the method performed by the control program further includes instructing the vanadium redox battery to absorb fuel power to maintain a system stability.

33. The power generation system of claim 29, wherein the method performed by the control program further includes instructing the vanadium redox battery to absorb fuel power to maintain a substantially constant system voltage.

34. The power generation system of claim 29, wherein the method performed by the control program further includes balancing a percentage of the system load between the fuel generators to achieve an optimal load for each fuel generator.

35. The power generation system of claim 34, wherein the method performed by the control program further includes powering down a fuel generator to achieve an optimal load for the operating fuel generators.

36. The power generation system of claim 34, wherein the method performed by the control program further includes powering up a fuel generator to achieve an optimal load for the operating fuel generators.

37. A control system for electrically communicating with a vanadium redox battery to control power absorption and generation, and for electrically communicating with a plurality of fuel generators to control fuel power generation, the control system comprising:
  a processor; and
  a memory in electrical communication with the processor and having a control program, the control program performing the method of,
    monitoring a system load
    determining a system stability by calculating a torgue angle,
    instructing the vanadium redox battery and the fuel generators to generate battery power and fuel power to maintain a system stability including instructing the vanadium redox battery and the fuel generators to generate battery power and fuel power to maintain a torgue angle at less than 90 degrees, and
    instructing the vanadium redox battery and the fuel generators to generate battery power and fuel power to maintain a substantially constant system voltage.

38. The control system of claim 37, wherein the method performed by the control program further includes instructing the vanadium redox battery to generate battery power to maintain a substantially constant system frequency.

39. The control system of claim 37, wherein the method performed by the control program further includes instructing the vanadium redox battery to absorb fuel power to maintain the system stability.

40. The control system of claim 37, wherein the method performed by the control program further includes instructing the vanadium redox battery to absorb fuel power to maintain a substantially constant system voltage.

41. The control system of claim 37, wherein the method performed by the control program further includes balancing a percentage of the system load between the fuel generators to achieve an optimal load for each fuel generator.

42. The control system of claim 41, wherein the method performed by the control program further includes powering down a fuel generator to achieve an optimal load for the operating fuel generators.

43. The control system of claim 41, wherein the method performed by the control program further includes powering up a fuel generator to achieve an optimal load for the operating fuel generators.

44. A method for operating a power generation system including a vanadium redox battery and a plurality of fuel generators, comprising:
  monitoring a system load;
  determining a system stability by calculating a torque angle;
  operating the vanadium redox battery and the fuel generators to generate battery power and fuel power to maintain a system stability including operating the vanadium redox battery and the fuel generators to generate battery power and fuel power to maintain a torque angle at less than 90 degrees; and operating the vanadium redox battery and the fuel generators to generate battery power and fuel power to maintain a substantially constant system voltage.

45. The method of claim 44, further comprising operating the vanadium redox battery to generate battery power to maintain a substantially constant system frequency.

46. The method of claim 44, further comprising instructing the vanadium redox battery to absorb fuel power to maintain the system stability.

47. The method of claim 44, further comprising instructing the vanadium redox battery to absorb fuel power to maintain a substantially constant system voltage.

48. The method of claim 44, further comprising balancing a percentage of the system load between the fuel generators to achieve an optimal load for each fuel generator.

49. The method of claim 48, further comprising powering down a fuel generator to achieve an optimal load for the operating fuel generators.

50. The method of claim 48, further comprising powering up a fuel generator to achieve an optimal load for the operating fuel generators.

51. A computer readable medium having stored thereon computer executable instructions for performing a method for operating a power generation system including a vanadium redox battery and a plurality of fuel generators, the method comprising:
monitoring a system load;
determining a system stability;
operating the vanadium redox battery and the fuel generators to generate battery power and fuel power to maintain a system stability; and
operating the vanadium redox battery and the fuel generators to generate battery power and fuel power to maintain a substantially constant system voltage
wherein determining the system stability includes calculating a torque angle, and wherein operating the vanadium redox battery and the fuel generators to generate battery power and fuel power to maintain the system stability includes operating the vanadium redox battery and the fuel generators to generate battery power and fuel power to maintain a torque angle at less than 90 degrees.

52. The computer readable medium of claim 51, wherein the method further comprises operating the vanadium redox battery to generate battery power to maintain a substantially constant system frequency.

53. The computer readable medium of claim 51, wherein the method further comprises instructing the vanadium redox battery to absorb fuel power to maintain the system stability.

54. The computer readable medium of claim 51, wherein the method further comprises instructing the vanadium redox battery to absorb fuel power to maintain a substantially constant system voltage.

55. The computer readable medium of claim 51, wherein the method further comprises balancing a percentage of the system load between the fuel generators to achieve an optimal load for each fuel generator.

56. The computer readable medium of claim 55, wherein the method further comprises powering down a fuel generator to achieve an optimal load for the operating fuel generators.

57. The computer readable medium of claim 55, wherein the method further comprises powering up a fuel generator to achieve an optimal load for the operating fuel generators.

* * * * *

UNITED STATES PATENT AND TRADEMARK OFFICE
CERTIFICATE OF CORRECTION

| | |
|---|---|
| PATENT NO. | : 7,353,083 B2 |
| APPLICATION NO. | : 11/035466 |
| DATED | : April 1, 2008 |
| INVENTOR(S) | : Timothy David John Hennessy |

It is certified that error appears in the above-identified patent and that said Letters Patent is hereby corrected as shown below:

Title page, item (65) Prior Publications Data add the following:

U.S. PATENT APPLICATION PUBLICATIONS

2004/0191623 A1    Kubata, et al.    429/189

Column 3, Line 43 reads, "... H.sub.2 SO.sub.4 and includes ..." which should read "... $H_2SO_4$ and includes ..."

Column 3, Line 45 reads, "... to 6M H.sub.2 SO.sub.4." which should read "... to 6M $H_2SO_4$."

Column 11, Line 13 reads, "... monitoring a system load" which should read "... monitoring a system load,"

Column 14, Line 21 reads, "... monitoring a system load" which should read "... monitoring a system load,"

Column 14, Line 22 reads, "... by calculating a torgue ..." which should read "... by calculating a torque ..."

Column 14, Line 29 reads, "... torgue angle at less than ..." which should read "... torque angle at less than ..."

UNITED STATES PATENT AND TRADEMARK OFFICE
CERTIFICATE OF CORRECTION

| | |
|---|---|
| PATENT NO. | : 7,353,083 B2 |
| APPLICATION NO. | : 11/035466 |
| DATED | : April 1, 2008 |
| INVENTOR(S) | : Timothy David John Hennessy |

It is certified that error appears in the above-identified patent and that said Letters Patent is hereby corrected as shown below:

Column 15, Line 2 reads, ". . . torgue angle at less than . . ." which should read ". . . torque angle at less than . . ."

Signed and Sealed this

Twenty-sixth Day of May, 2009

JOHN DOLL
*Acting Director of the United States Patent and Trademark Office*